United States Patent [19]
Allmond et al.

[11] Patent Number: 6,072,803
[45] Date of Patent: *Jun. 6, 2000

[54] AUTOMATIC COMMUNICATION PROTOCOL DETECTION SYSTEM AND METHOD FOR NETWORK SYSTEMS

[75] Inventors: David M. Allmond; Laura E. Whitmire; Ahmad Nouri; Thao Minh Hoang, all of Carrollton; Hieu M. Hoang, Flower Mound; Arthur T. Bennett, Coppell, all of Tex.

[73] Assignee: Compaq Computer Corporation, Houston, Tex.

[*] Notice: This patent is subject to a terminal disclaimer.

[21] Appl. No.: 09/062,892

[22] Filed: Apr. 20, 1998

Related U.S. Application Data

[63] Continuation of application No. 08/608,819, Feb. 29, 1996, Pat. No. 5,754,552, which is a continuation-in-part of application No. 08/501,288, Jul. 12, 1995, Pat. No. 5,742,602, which is a continuation-in-part of application No. 08/560,531, Nov. 17, 1995, Pat. No. 5,666,359.

[51] Int. Cl.[7] .................................................. H04L 12/413
[52] U.S. Cl. .......................................... 370/445; 370/465
[58] Field of Search ................................... 370/465, 257, 370/410, 401, 402, 359, 445

[56] References Cited

U.S. PATENT DOCUMENTS

| | | |
|---|---|---|
| 5,305,317 | 4/1994 | Szczepanek . |
| 5,438,570 | 8/1995 | Karras et al. ............................ 370/426 |
| 5,469,545 | 11/1995 | Vanbuskirk et al. ..................... 370/434 |
| 5,541,957 | 7/1996 | Lau . |
| 5,568,525 | 10/1996 | de Nijs et al. . |
| 5,574,722 | 11/1996 | Slykhouse et al. . |
| 5,586,117 | 12/1996 | Edem et al. ............................. 370/466 |
| 5,600,644 | 2/1997 | Chang et al. . |
| 5,617,418 | 4/1997 | Shirani et al. . |
| 5,687,174 | 11/1997 | Edem et al. ............................. 370/453 |
| 5,754,552 | 5/1998 | Allmond et al. ........................ 370/465 |

*Primary Examiner*—Min Jung
*Attorney, Agent, or Firm*—Akin, Gump, Strauss, Hauer & Feld, LLP

[57] ABSTRACT

A communication protocol detection system for enabling a network system to detect and interface one or more network devices each operating according to at least one of a plurality of different communication protocols. In one embodiment, a network interface card (NIC) is capable of operating according to one of two different communication protocols, such as the 10Base-T and 100Base-TX Ethernet Standards. The NIC includes two corresponding transceivers, where the transceivers are interfaced to a network connector for interfacing an external network device. Control logic initially enables the 10Base-T transceiver to determine if link pulses are detected. If link pulses are detected, the 100Base-T transceiver is enabled to determine if it detects the link pulses. If so, the 100Base-T transceiver is used to establish communications, and if not, the 10Base-T transceiver is used. Preferably, the 100Base-T transceiver is re-enabled a predetermined number of times to determine if the network device is a 100 Mbps device. In another embodiment, a repeater includes a plurality of interface circuits, each including a plurality of transceivers. Each of the transceivers of each of the interface circuits of each port is connected to a corresponding repeater module through an array of buses. Control logic enables the transceivers one at a time within each interface circuit and correspondingly monitors the corresponding link signal. When an enabled transceiver detects link pulses, that transceiver is used to establish communications. If a link signal indicates termination of communications, enabling of the transceivers one at a time is resumed.

15 Claims, 10 Drawing Sheets

AUTOMATIC COMMUNICATION PROTOCOL DETECTION SYSTEM AND METHOD FOR NETWORK SYSTEMS

CROSS-REFERENCE TO RELATED APPLICATIONS

This is a continuation of U.S. patent application Ser. No. 08/608,819 titled "Automatic Communication Protocol Detection System and Method for Network System," filed Feb. 29, 1996, now U.S. Pat. No. 5,754,552 whose inventors were David Allmond, et al., which is a continuation-in-part of U.S. patent applications Ser. No. 08/501,288 titled "Adaptive Repeater System" filed Jul. 12, 1995, now U.S. Pat. No. 5,742,602 whose inventor was Arthur T. Bennett, and Ser. No. 08/560,531 titled "Method and Apparatus for Displaying Port Information" filed Nov. 17, 1995, now U.S. Pat. No. 5,666,359 whose inventors were Arthur T. Bennett and K. Arlan Harris, all three of which are assigned to Compaq Computer Corporation, and all three of which are hereby incorporated by reference in their entirety.

FIELD OF THE INVENTION

The present invention relates to the field of networking data devices, and more particularly, to automatically detecting and interconnecting network devices, each operating according to any one of a plurality of communication protocols.

DESCRIPTION OF THE RELATED ART

Ethernet is a shared-media network architecture defined in the Institute of Electrical and Electronics Engineers (IEEE) 802.3 standard, and is currently the most widely used architecture for local-area networks (LANs). Ethernet uses both bus and star topologies having nodes attached to a trunk segment, which is the main piece of cable in an Ethernet network. The 10Base-T is a communication protocol based on the IEEE 802.3 standard, which is a baseband 802.3-based Ethernet network that operates up to 10 Mbps (Megabits per second), and uses unshielded twisted-pair (UTP) cable configured in a star topology. The 10Base-T protocol is also known as twisted-pair Ethernet or UTP Ethernet.

Another Ethernet standard has emerged, referred to as fast Ethernet or 100Base-T Ethernet, which includes implementations capable of 100 Mbps transmissions speeds over UTP and is defined in IEEE 802.3u. 100Base-T covers three media types, which includes 100Base-T4using four pairs of category 3, 4 or 5 UTP wire, and another twisted-wire pair scheme referred to as 100Base-TX using two pairs of category 5 UTP or shielded twisted-pair (STP) wire. Several categories are defined by the Telecommunications Industry Association (TIA) in a TIA-568 standard, where the higher the category number, the higher the quality of the cable and the better the transmission characteristics. Category 3 balanced cables have transmission characteristics specified up to 16 MHz, category 4 balanced cables are specified up to 20 MHz, and category 5 balanced cable is specified up to 100 MHz. Also, a 100Base-FX scheme is defined for use with fiber optic cables.

In a star configuration, several nodes or computers are connected together through a common hub or concentrator. A hub is a component that serves as a common termination point for multiple nodes and that relay signals along the appropriate paths. Generally, a hub is a box with a number of connectors to which nodes are attached. Hubs usually accommodate a plurality of segments or nodes, such as 4, 8, 12, 24 or more nodes, and many hubs include connectors for linking to other hubs. Each node in the network is typically a computer of some type, such as a personal computer (PC), Macintosh, minicomputer, mainframe, or the like, where the computer generally includes a network interface card (NIC) for interfacing the node to the hub to enable networking capabilities. In the present disclosure, each node or segment is associated with a network device or data terminal equipment (DTE), where each generally refers to any source or destination of data connected to any network system, such as a LAN or the like.

For the SBase-T Ethernet notations, the first prefix S is a number referring to the speed of the network in Mbps, the middle designation refers to the band type, and the suffix refers to the physical medium through which the signals are carried. The speed is usually designated in Mbps, such as 10 or 100 Mbps. The band is typically either baseband or broadband. A baseband network allows one node to broadcast at a time as compared to a broadband network, where multiple nodes can broadcast at the same time. Variations of the Ethernet 802.3-based standard supports broadband communications. The physical medium is typically twisted-pair, such as T4 or TX, for example, although other mediums are known, such as 10Base-F for fiber-optic cable, including fiber passive (FP), fiber link (FL) and fiber backbone (FB).

Twisted-pair Ethernet networks typically use RJ-45 modular connectors or variations thereof The RJ-45 connector may by used for 100Base-T Ethernet, but another connector based on the International Standardization Organization (ISO) 8877 standard may also be used, which is a variant of the RJ-45 connector compatible with connectors in countries other than the U.S. An RJ-45 connector is similar to, but larger than, a typical RJ-11 phone connector and is typically used for interfacing four twisted-wire pairs within a twisted-pair cable. The 100Base-T4 scheme uses all four pairs, where a first pair is used for a transmit signal, a second pair is used for a receive signal and the remaining two pairs are used for transmitting in either direction. In particular, each transmitting device transmits the signal on three of the four pairs. In the 100Base-TX scheme, one twisted pair is used for the transmit signal, a second pair is used for the receive signal, and the remaining two pairs are unused.

It is noted that the present disclosure, as well as the present invention, is not limited to any particular communications protocol or standard, and may be applied to other protocols and mediums. For example, a 100 Mbps, fiber optic-based, token-ring LAN standard is also contemplated, referred to as the Fiber Distributed Data Interface (FDDI) is also contemplated. Also, the Copper Distributed Data Interface (CDDI) is contemplated, which is a copper version of FDDI using twisted-pair cables.

A network operating according to a given communications protocol may be expanded by using one or more repeaters. A repeater is a hardware device that functions at the physical layer of the Open Systems Interconnection (OSI) Reference Model and that is used to connect two segments of the same network. In particular, a repeater receives data from a data device in one segment and re-transmits the data to data devices attached to another segment by the repeater. For example, a 10 Mbps repeater in a star configuration with six ports receives a data message on one of its ports and repeats or re-transmits the message to the remaining five ports. However, a repeater is typically not used to connect networks operating at different protocols. The advent of the 100 Mbps standard and a corresponding transition in the industry towards higher transmission rates often results in hybrid systems that service both 10 Mbps and 100 Mbps data devices. Furthermore, several different 100 Mbps standards are defined depending upon the particular needs of a network and available resources. As a result, many networks are servicing data devices that operate using different communications protocols.

As networks have evolved with a mix of data devices operating with different communications protocols, repeater couplings and hardware typically had to be modified. It is desired to improve effective management of these multi-protocol communication systems.

SUMMARY OF THE INVENTION

A communication protocol detection system according to the present invention enables a network system to detect and interface a network device operating according to any one of a plurality of different communication protocols. The network system preferably includes a plurality of interface circuits electrically coupled to a network port for externally connecting the network device, where each interface circuit corresponds to one of the plurality of different communication protocols. The interface circuits are capable of detecting signals from a compatible network device coupled to the port and for providing a link signal indicative thereof. Furthermore, control logic is provided to enable the plurality of interface circuits one at a time and to receive the link signal, where the control logic enables the appropriate interface circuit based on the link signal.

In one embodiment according to the present invention, a network interface card (NIC) includes a media access device (MAC) capable of operating according to one of two different communication protocols. Preferably, the protocols are according to the 10Base-T and 100Base-T Ethernet Standards, where the 100Base-T standard is preferably the 100Base-TX standard. The NIC includes a 10Base-T and a 100Base-T transceiver coupled to two ports of the MAC, respectively, where the transceivers are also interfaced to a network connector for interfacing to a network, which includes one or more external network devices, such as repeaters, switches, hubs, DTEs, etc. Preferably, communication occurs across twisted-pair cables including RJ-45 connectors or the like. Control logic asserts an enable signal for enabling one transceiver while disabling the other, and vice versa, and also receives a link signal from both of the transceivers. Each transceiver, when enabled, asserts a link signal in response to detecting link pulses provided by a network device coupled to the network connector. However, the 10Base-T transceiver detects link pulses asserted by both 10 Mbps and 100 Mbps network devices, whereas the 100Base-T transceiver only detects link pulses asserted by 100 Mps devices. The NIC is preferably plugged into an input/output (I/O) bus of a computer system including a processor executing a software driver or routine for controlling operations of the NIC.

Pursuant to a method according to the present invention, the 10Base-T transceiver is initially enabled for detecting link pulses. When the 10Base-T transceiver detects link pulses and asserts a link signal, the NIC informs the processor by interrupting the processor or by setting a bit in a register polled by the processor. In response, the processor enables the 100Base-T transceiver to determine if it detects link pulses. If so, the 100Base-T transceiver is used to establish communications between the network device and the MAC. If not, the 10Base-T transceiver is used to establish communications. It is noted that jiggling of the connector while making the connection might otherwise result in erroneous detection of the communication protocol used by the network device being connected. Thus, the 100Base-T transceiver is re-enabled a predetermined number of times while the link signal is monitored to determine if the network device is a 100 Mbps device. If the 100Base-T transceiver detects the network device during any of these iterations, it is used for communications. If not, and if the 10Base-T transceiver still detects the network device, then the 10Base-T transceiver is used to establish communications. Alternatively, the 100Base-T transceiver may be enabled for a predetermined time period for determining if the network device is a 100 Mbps device.

In an alternative mode of operation, the processor toggles enabling between the two transceivers until link pulses are detected. If the 100 Mbps transceiver is enabled when the link pulses are detected, then it is used for establishing communications. If the 10 Mbps transceiver is enabled, however, it is either used to establish communications, or the processor enables the 100 Mbps one or more times to determine whether the connected network device is a 10 or 100 Mbps device. If the 10 Mbps transceiver detects link pulses and the 100 Mbps transceiver does not after one or more iterations, then the 10 Mbps transceiver is used.

The present invention may also be used to detect and interface a plurality of network devices operating according to any one of a plurality of communication protocols. A communication protocol detection system according to another embodiment of the present invention includes a plurality of network connectors and a corresponding plurality of interface circuits. Each of the plurality of interface circuits includes a plurality of transceivers coupled to a corresponding network connector, where each of the plurality of transceivers corresponds to one of said plurality of communication protocols. Also, each of the plurality of transceivers is separately enabled for detecting signals indicative of connection of a compatible network device coupled to the corresponding network connector, where the enabled transceiver provides a corresponding one of a plurality of link signals. Control logic is provided for receiving and monitoring the link signals, where the control logic enables one of the plurality of transceivers within each of the plurality of interface circuits corresponding to the detected network device.

The plurality of communication protocols preferably includes at least one protocol according to the Ethernet 100Base-T standard. For example, the communication protocols preferably include the 100Base-TX and the 100Base-T4 standards. The communication protocols may further include the 10Base-T Ethernet standard and the CDDI standard. Each of these standards are compatible with twisted-pair cables and RJ-45 connectors, where each of the port connectors of the network system may be standardized to the RJ-45 type connector. Alternatively, the communication protocols could include the FDDI and the 100BaseFX protocols, each of which uses fiber optic cable and compatible connectors.

In a more particular embodiment, a communication protocol detection system according to the present invention may be incorporated within an adaptive repeater for sensing a network device connected to any one of a plurality of port connectors, and for programming that port to place the device into the appropriate protocol domain. The control logic enables each of the transceivers one at a time in round-robin fashion and correspondingly monitors the link signals indicating the detection of link pulses. When an enabled transceiver detects link pulses and asserts a corresponding link signal, the control logic maintains enablement of that transceiver to establish communications. Each of the transceivers of each of the interface circuits of each port is preferably connected to a corresponding repeater module through an array of buses. In this manner, when a network device is coupled to a compatible repeater through an enabled transceiver, the network device communicates with every other compatible network device coupled to the repeater system. In particular, each network device receives data from every other compatible network device coupled to the repeater, and also sends data to every other compatible device. Compatible devices are coupled through the same repeater module within the repeater system and grouped into one of several domains.

If a device changes protocol, or is disconnected, or if a different device is connected which operates at a different protocol, the detection system detects this status change by detecting that the corresponding link signal is no longer being provided by the enabled transceiver. The control logic then continues enabling the transceivers one at a time until an enabled transceiver provides a link signal. That enabled transceiver is then used to establish communications with the new or modified network device.

It is now appreciated that a communication protocol detection system and method according to the present invention enables a network system to automatically detect and communicate with a network device operating according to any one of several communication protocols. The present invention may be applied to enable a network card of a computer system to detect and connect to an external network using the appropriate and compatible protocol. The present invention may also be applied to more sophisticated network devices, such as repeaters, hubs, concentrators, or the like, to enable interfacing and communication among a plurality of network devices, each operating according to any one of a plurality of communication protocols. This capability enables the network system to be managed, upgraded and/or reconfigured without the need for modification of hardware.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
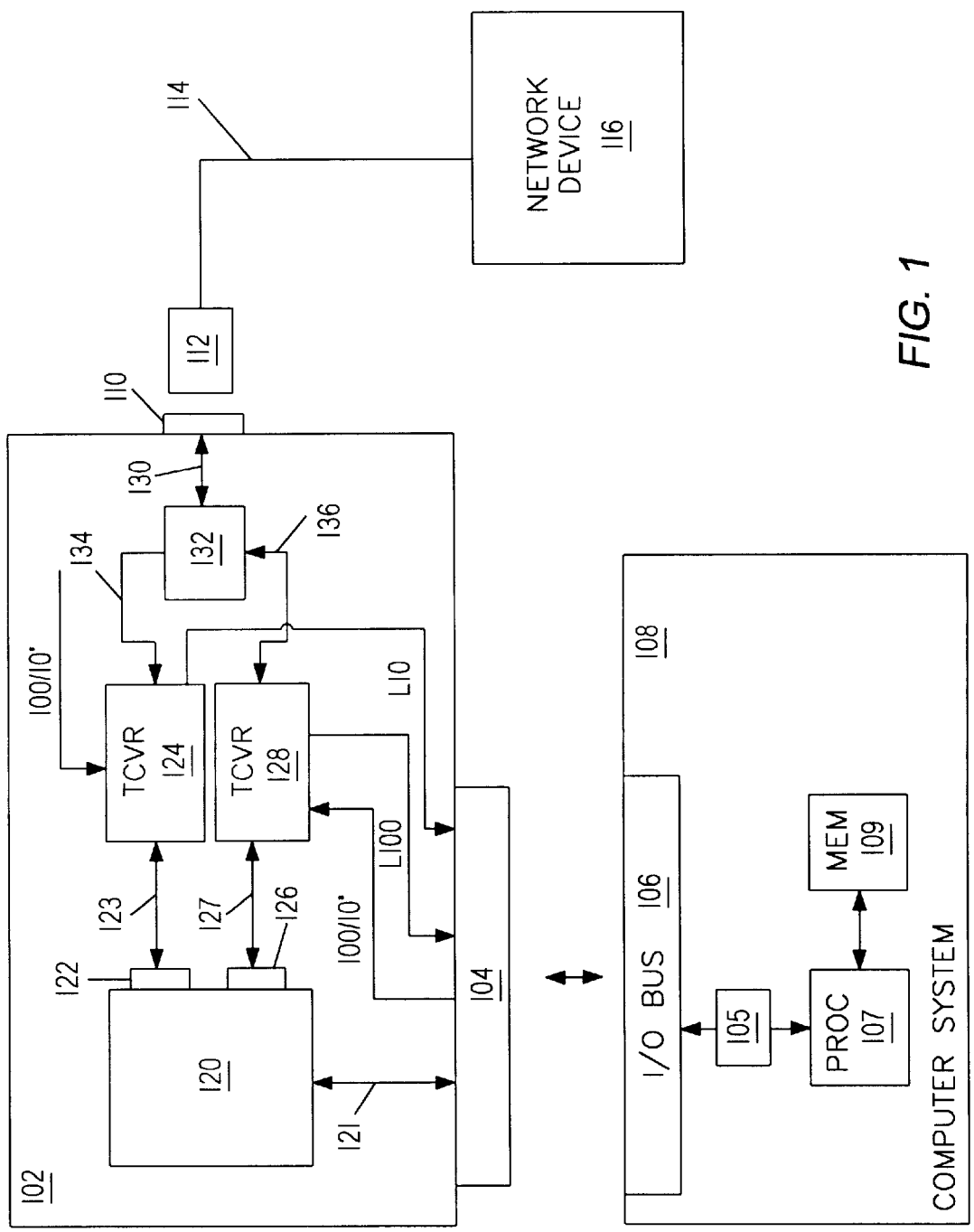
FIG. 1 is a block diagram illustrating a network system including an automatic detection system for adaptive networking devices according to the present invention.

Referring now to FIG. 1, a block diagram is shown of a network 100, which includes an automatic communication protocol detection system according to the present invention. The network 100 includes a network interface card (NIC) 102, which preferably includes an edge connector 104 for plugging into a slot for interfacing an input/output (110) bus 106 of a computer system 108. The computer system 108 may be any one of several types of computers or personal computers (PCs), such as an IBM compatible, a Macintosh by Apple Computer, or any other PC as known to those skilled in the art. The computer system 108 preferably includes a processor 107 coupled to a memory device 109 for storing driver software or routines for execution by the processor 107. The computer system 108 further includes I/O interface circuitry 105 for interfacing the processor 107 with the I/O bus 106 to enable communication with interface cards and boards plugged into slots of the I/O bus 106, such as the NIC 102. In this manner, the processor 107 executes any necessary procedures or routines for monitoring and for controlling the configuration and operation of the NIC 102, as further described below.

Communication between the NIC 102 and the processor 107 of the computer system 108 may be implemented in one of many different ways as known to those skilled in the art. For example, the NIC 120 may assert a signal to interrupt the processor 107. Alternatively, the NIC 120 may assert a signal to set a bit in a register, which register is periodically polled by the processor 107. In any event, the processor 107 responds by executing a driver or software routine to control the MAC 120 to establish communications.

The NIC 102 includes at least one network port having a connector 110, which is preferably an RJ-45 jack adapted for receiving a comparable RJ-45 plug. An external network device 116 includes a twisted-pair cable 114 integrally connected to an RJ-45 plug 112 for interfacing the NIC 102 to the network device 116 when the plug 112 is inserted into the connector 110. The term "network device" generally refers to any device coupled to a network such as a LAN or the like, such as another NIC, a repeater, a hub, a concentrator, a switch, a bridge, a DTE or any other intermediate device or source or destination of data. The communication between the NIC 102 and the network device 116 through the twisted-pair cable 114 is preferably based on an Ethernet communication protocol operating at either 10 Megabits per second (Mbps), according to the 10Base-T architecture based on the IEEE 802.3 standard, or operating at 100 Mbps, according to a 100Base-T architecture based on the IEEE 802.3u standard. According to the present invention, the NIC 102 includes the capability to automatically detect either of these communication protocols used by the network device 116 and switches to the appropriate protocol automatically.

The NIC 102 preferably includes a media-access control (MAC) device 120 capable of operating at either the 10Base-T or 100Base-T communications protocol. The 100Base-T protocol is preferably the 100Base-TX protocol, although other suitable protocols are contemplated. The MAC 120 is interfaced to the edge connector 104 through a bus 121 including one or more signal lines for enabling communication with the computer system 108 when plugged into an I/O slot. The MAC 120 includes a first port 122 for interfacing a 10Base-T transceiver 124 across a communication link 123, and the MAC 120 also includes a second port 126 for interfacing a 100Base-T transceiver 128 across a communication link 127. A signal 100/10* is provided from the computer system 108 across the I/O bus 106 to enable either one of the transceivers 124 and 128 one at a time in a mutually-exclusive manner. The processor 107 asserts a corresponding enable signal to the I/O interface circuitry 105, which asserts the 100/10* signal. The 100/10* signal is asserted high for enabling the 100Base-T transceiver 128 and for disabling the 10Base-T transceiver 124, and is asserted low for enabling the 10Base-T transceiver 124 and disabling the 100Base-T transceiver 128. Of course, two separate enable signals could be used instead, although it is desired that only one transceiver be enabled at a time. Both transceivers 124, 128 preferably enable bidirectional communications.

The connector 110 is coupled to an interface device 132 through a communication link 130, where the interface device 132 is further coupled to the 10Base-T transceiver 124 across a communication link 134 and to the 100Base-T transceiver 128 through a communication link 136. In the preferred embodiment, the interface device 132 includes a transformer or the like having primary windings coupled to the conductors of the link 130 and secondary windings coupled to the conductors of the links 134 and 136. This enables communication in either direction between the 10Base-T and 100Base-T transceivers 124 and 128 and the network device 116 when connected.

Both of the transceivers 124 and 128 assert a link signal in the event the network device 116 is detected connected to the connector 110 and asserting link pulses. In particular, the 10Base-T transceiver 124 asserts a link signal L10 and the 100Base-T transceiver 128 asserts a signal L100, which signals are provided to the processor 107 across the I/O bus 106. Two separate link signals enable the processor 107 to monitor the transceivers individually. However, in the preferred embodiment, only one of the transceivers 124, 128 is enabled at a time, so that the L10 and L100 link signals may be multiplexed on the NIC 102 or the computer system 108 to provide a single link signal, which is referred to as LINK Thus, the signal "LINK" refers to the link signal of the particular transceiver enabled at any given time.

In general, when the network 100 is powered on and the network device 116 is plugged into the NIC 102, the network device 116 continually sends link pulses. The 10Base-T transceiver 124, if enabled, detects the link pulses from the network device 116 regardless of whether the network device 116 is operating according to 10Base-T or 100Base-T, and correspondingly asserts the LINK signal to processor 107. The 100Base-T transceiver 128 also is asserts the LINK signal to the processor 107 if it is enabled and detects link pulses from the network device 116. However, the 100Base-T transceiver 128 only detects link pulses from the network device 116 if it is a 100Base-T device, and does not detect the link pulses if the network device 116 is a 10Base-T device. Thus, the 10Base-T transceiver 124 is initially enabled by default, and the processor 107 tests the 100Base-T transceiver 128 after the 10Base-T transceiver 124 asserts the LINK signal.

Figure 2A:
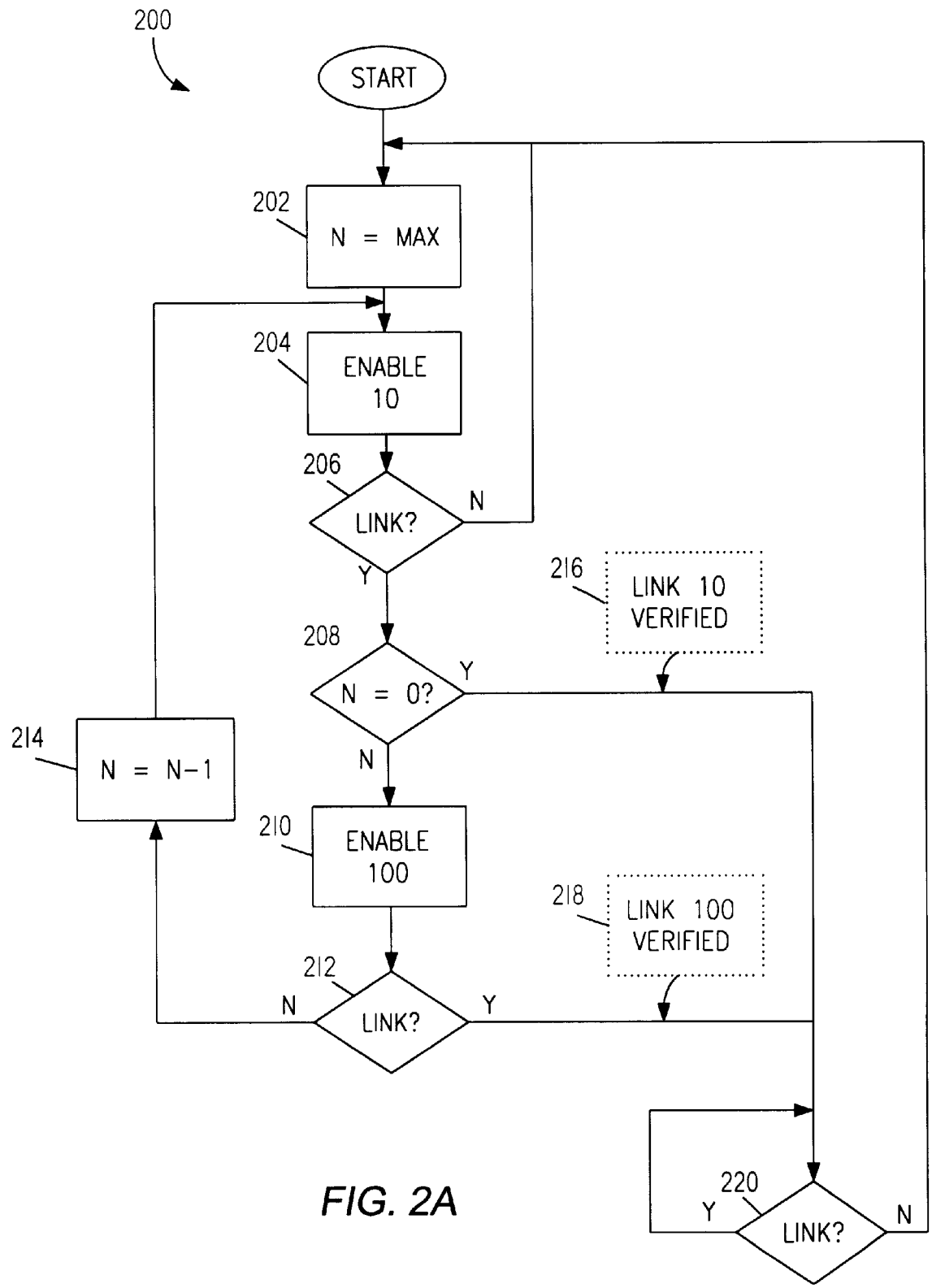
FIGS. 2A, 2B and 2C are flowchart diagrams illustrating various modes of operation of the automatic detection system of FIG. 1.

One mode of operation of the network 100 shown in FIG. 1 is now described with reference to a flowchart illustrated in FIG. 2A. In the preferred embodiment, the NIC 102 is plugged into the I/O bus 106 of the computer system 108 and a software driver or routine is loaded within the memory device 109 and executed by the processor 107. Of course, the driver could be implemented in hardware or software and further could be provided on board the NIC 102. When the computer system 108 and the NIC 102 are first powered on, the software driver is loaded and executed by the processor 107 and operates according to the flowchart In step 202, an integer N is set equal to a maximum value MAX for controlling an iteration loop further described below. Operation proceeds to step 204, where the processor 107 enables the 10Base-T transceiver 124 in step 204. In particular, the 100/10* signal is asserted low for enabling the 10Base-T transceiver 124 and for disabling the 100Base-T transceiver 128. Operation proceeds to step 206, where the processor 107 monitors the LINK signal to determine if the 10Base-T transceiver 124 is receiving link pulses from the network device 116. As long as the network device 116 remains disconnected from the network port 110 of the NIC 102 or otherwise powered off, the LINK signal is not detected and operation continues to loop back to step 202 from step 206.

When the network device 116 is connected to the NIC 102 and turned on, it begins asserting link pulses on the cable 114, which is transferred to the 10Base-T transceiver 124 through interface 132 and the communication links 130, 134. The 10Base-T transceiver 124 detects these link pulses and asserts the LINK signal, which is detected by the processor 107 in step 206. Operation proceeds to step 208, where the integer N is compared to zero. If the integer N has not been decremented to zero, operation proceeds to step 210, where the processor 107 enables the 100Base-T transceiver 128 and disable the 10Base-T transceiver 124. Operation proceeds to step 212, where the LINK signal is again monitored for determining whether link pulses are being detected by the 100Base-T transceiver 128. If not, then the network device 116 is possibly operating at the 10Base-T protocol and not the 100Base-T protocol. Operation then proceeds to step 214 to decrement the integer N, and then operation returns back to step 204, where the 10Base-T transceiver 124 is re-enabled and the 100Base-T transceiver 128 is disabled. Operation loops between steps 204, 206, 208, 210, 212 and 214 for MAX iterations as long as link pulses are detected by the 10Base-T transceiver 124 but are not detected by the 100Base-T transceiver 128.

If the network device 116 operates according to the 10Base-T protocol and not according to the 100Base-T protocol, then eventually the integer N is decremented to zero, and operation proceeds to step 220 from step 208, where a link has been established according to the 10Base-T protocol as indicated by a comment block 216. In this case, the 10Base-T transceiver 124 remains enabled and the MAC 120 communicates with the network device 116 according to the 10Base-T protocol. However, if a LINK signal is detected in step 212 while the 100Base-T transceiver 128 is enabled, operation proceeds from step 212 to step 220, where a link has been established according to the 100Base-T protocol as indicated by a comment block 218. In the latter case, the 100Base-T transceiver 128 remains enabled during step 220. In step 220 the processor 107 continually monitors the LINK signal to determine whether the network device 116 remains connected and communications are not terminated. If the network device 116 is disconnected or if communications are otherwise terminated, then the LINK signal is not detected in step 220, and operation proceeds back to step 202 to repeat the entire procedure.

It is noted that if any of the connectors are jiggled by the user when attaching a 100Base-T protocol network device 116, such jiggling could result in making and breaking the connection at a certain rate, which could cause the NIC 102 to improperly detect only a 10 Mbps device rather than a 100 Mbps device. Because of this possibility, the integer N is used to retest the 100 Mbps a plurality of times (MAX) and at a much faster and more precise rate than the user could possibly jiggle the connection, thereby implementing a fool-proof connection. The value MAX identifies the number of iterations for testing the 100 Mbps connection. Through experimentation, it has been determined that a MAX value of six (6) is adequate for properly testing the 100 Mbps connection, although any number of iterations could be used to properly test the connection without being beyond the scope of the present invention. Thus, the processor 107 tests the 100Base-T transceiver 128 six times in the is preferred embodiment before determining that the external device 116 is a 10 Mbps device. If during these iterations link pulses are ever detected by the 100Base-T transceiver 128, then it is determined that the external device 116 is a 100 Mbps device.

Figure 2B:
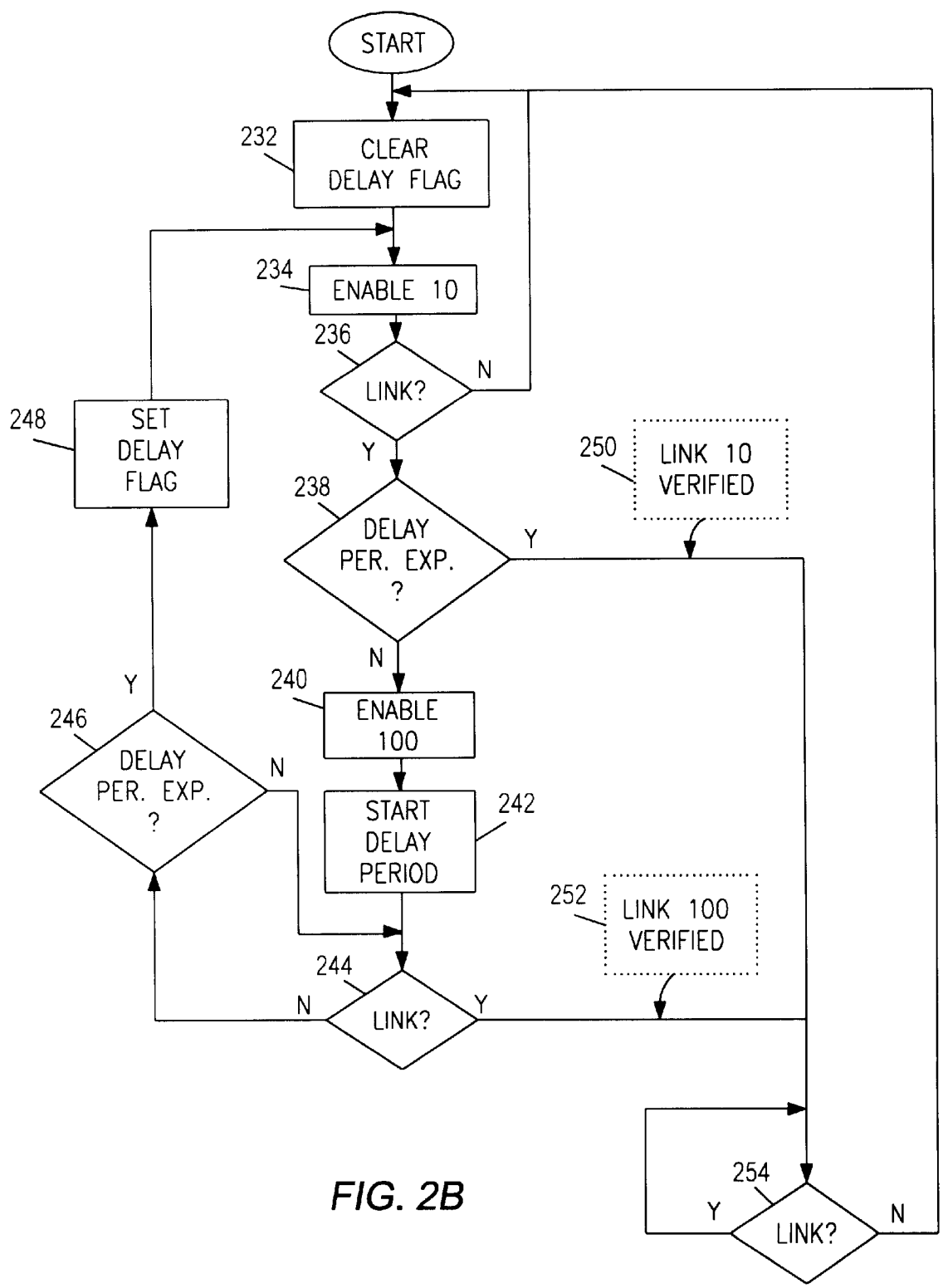

An alternative mode of operation is illustrated by a flowchart in FIG. 2B. Rather than MAX iterations, the 100Base-T transceiver 128 is enabled for a predetermined time period and the LINK signal periodically monitored. The delay period may be implemented in software or by a hardware timer or in any other suitable fashion. A delay flag is cleared in a step 232 before the 10Base-T transceiver 124 is enabled in step 234. Again, the LINK signal is checked in step 236, where operation returns to step 232 if the LINK signal is not asserted. If the LINK signal is detected in step 236, the delay flag is checked in step 238. If the delay flag has been set indicating expiration of the delay period as determined in step 238, operation proceeds to step 254 where communications are established using the 10Base-T transceiver 124, as indicated by comment block 250. Otherwise, operation proceeds to step 240, where the 100Base-T transceiver 128 is enabled. In this case, after the 100Base-T transceiver 128 is enabled, the delay period is initiated in step 242, and then the LINK signal is monitored in step 244. If the LINK signal is not asserted as determined in step 244, then operation proceeds to step 246 to determine if the delay period has expired. If the delay period has not expired as determined in step 246, operation proceeds back to step 244. In this manner, the LINK signal is periodically monitored during the delay period while the 100Base-T transceiver 128 is enabled If link pulses are ever detected while the 100Base-T transceiver 128 is enabled and before the delay period expires, then operation proceeds to step 254 and communications are established at 100 Mbps, as indicated by comment block 252.

However, if link pulses are not detected by the 100Base-T transceiver 128 and the delay period expires as determined in step 246, then the delay flag is set in a step 248 and operation returns back to step 234, where the 10Base-T transceiver 124 is re-enabled. The LINK signal is once again monitored in step 236 to determine if link pulses are still being received. If so, the delay flag has been set, so that operation proceeds to step 254 from step 238 and communication is established using the 10Base-T transceiver 124. If the link pulses are not detected in step 236, operation returns back to step 232, where the delay flag is cleared, and the entire procedure is repeated.

Figure 2C:
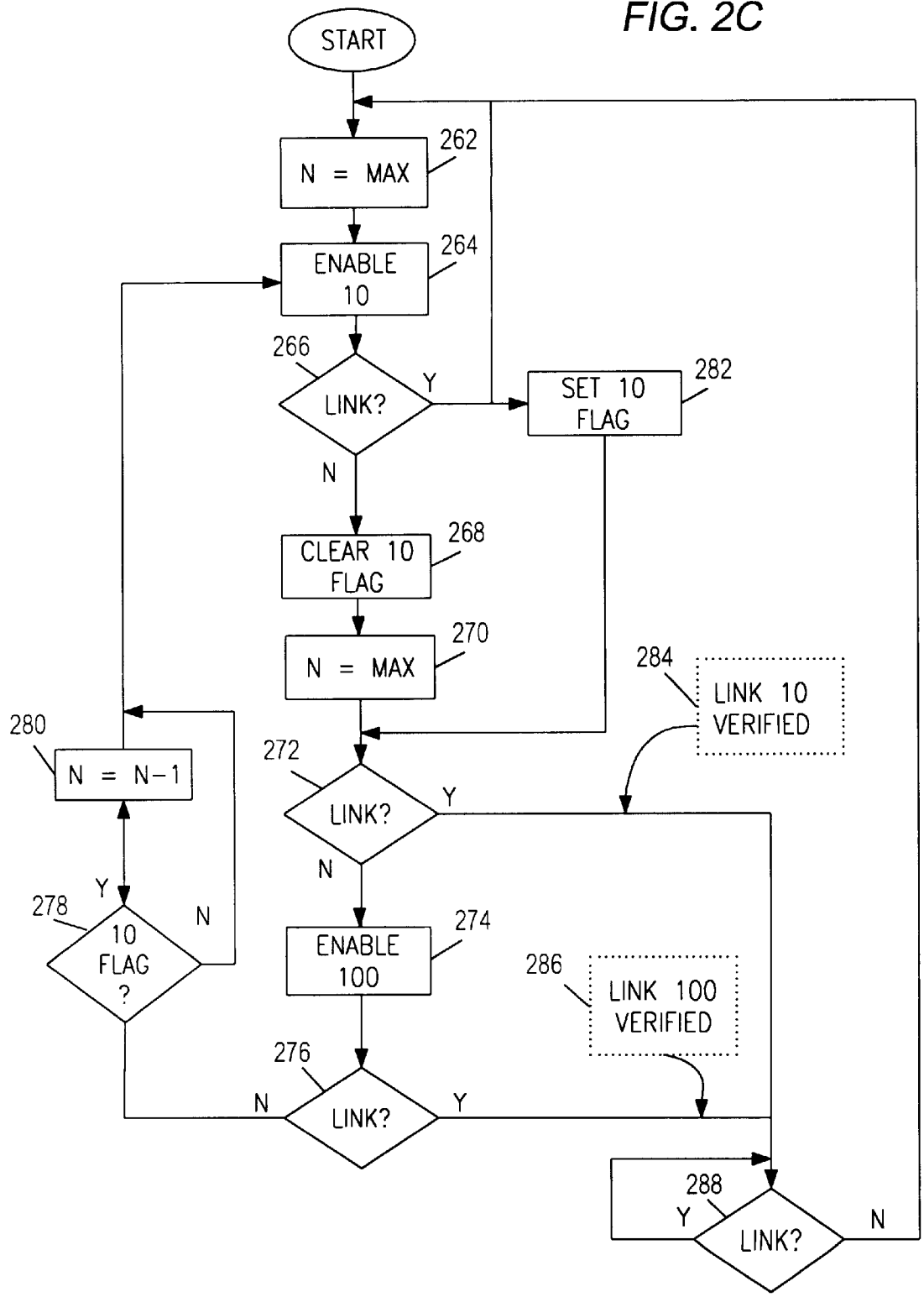

FIG. 2C illustrates a flowchart according to yet another alternative mode of operation of the network 100 of FIG. 1. Operation is similar to that of the flowchart of FIG. 2A, except that both transceivers 124 and 128 are toggled until link pulses are detected. If the 100Base-T transceiver 128 ever detects pulses, it is used. If the 10Base-T transceiver 124 detects link pulses, then the 100Base-T transceiver 128 is again enabled for several iterations to determine if it detects link pulses.

Operation begins in steps 262 and 264, where N is set to MAX and the 10Base-T transceiver 124 is enabled. The LINK signal is checked in step 266. If the LINK signal is not asserted, however, operation proceeds to step 268 to clear a flag, called "10 flag", indicating link pulses were not detected by the 10Base-T transceiver 124. Operation then proceeds to step 270, where N is set to MAX again. Operation then proceeds to step 272 to compare N to zero. If link pulses were detected and the LINK signal was asserted as determined in step 266, operation proceeds to step 282 to set the 10 flag indicating that the 10Base-T transceiver 124 has detected link pulses. In step 272, if N is not zero, operation proceeds to step 274 to enable the 100Base-T transceiver 128. The LINK signal is checked in step 276, and if not asserted, operation proceeds to step 278 to check the 10 flag. If the 10 flag is set as determined in step 278, then link pulses were detected by the 10Base-T transceiver 124 but not the 100Base-T transceiver 128, so that N is decremented in step 280 and operation proceeds back to step 264. Otherwise, if the 10 flag was not set as determined in step 278, operation returns directly to step 264.

If N is decremented to zero as determined in step 272, then link has been verified at 10 Mbps, as indicated by a comment block 284, and operation proceeds to step 288 to periodically determine that link remains established. If link pulses are ever detected by the 100Base-T transceiver 128, as determined in step 276, then operation proceeds to step 288 where link is verified at 100 Mbps, as indicated by comment block 286. Once a link is established, the LINK signal is periodically monitored in step 288 to determine whether the link remains established. If not, operation returns to step 262 to repeat the entire procedure.

In this manner, in the mode of operation according to FIG. 2C, the 10Base-T and 100Base-T transceivers 124, 128 are continuously toggled until link pulses are detected. This prevents the system from possibly being locked into a 10 Mbps mode if a 100 Mbps device is connected. If a 100 Mbps device is ever detected, then the 100Base-T transceiver 128 is used. If link pulses are detected by the 10Base-T transceiver 124, then the 100Base-T transceiver 128 is checked for MAX iterations to assure that the device is not a 100 Mbps device in a similar manner as described previously.

The embodiments described in FIGS. 1, 2A, 2B and 2C enable a computer system to connect to a network device or even to a network system operating according to either communication protocol supported by the NIC 102. The automatic detection system detects the appropriate protocol of the network device and establishes communication at that protocol. Although only two protocols were shown and described, a detection system according to the present invention encompasses detection of and connection to one of a plurality of different communication protocols. Furthermore, it is desired to implement such detection capability in other network devices, such as a repeater.

A repeater is a device that operates at the physical layer of the Open Systems Interconnection (OSI) Reference Model and which moves all packets from one network segment to another by regenerating, retiming, and amplifying the electrical signals. The main purpose of a repeater is to extend the length of the network transmission medium beyond the normal maximum cable lengths. A repeater typically supports a single communication protocol and may have a plurality of ports, where data received on any one port is duplicated and repeated to the remaining ports. It is desired, however, to provide an adaptive and hybrid repeater which operates at several different communication protocols for supporting a plurality of different domains rather than a single domain. To achieve this capability, however, it is desired that the repeater automatically detect the protocol of a device connected to a given port, and connect that port to the appropriate domain of the repeater. The method described above is extended to a plurality of ports and a plurality of repeater modules within an adaptive repeater device, as further described below.

Figure 3:
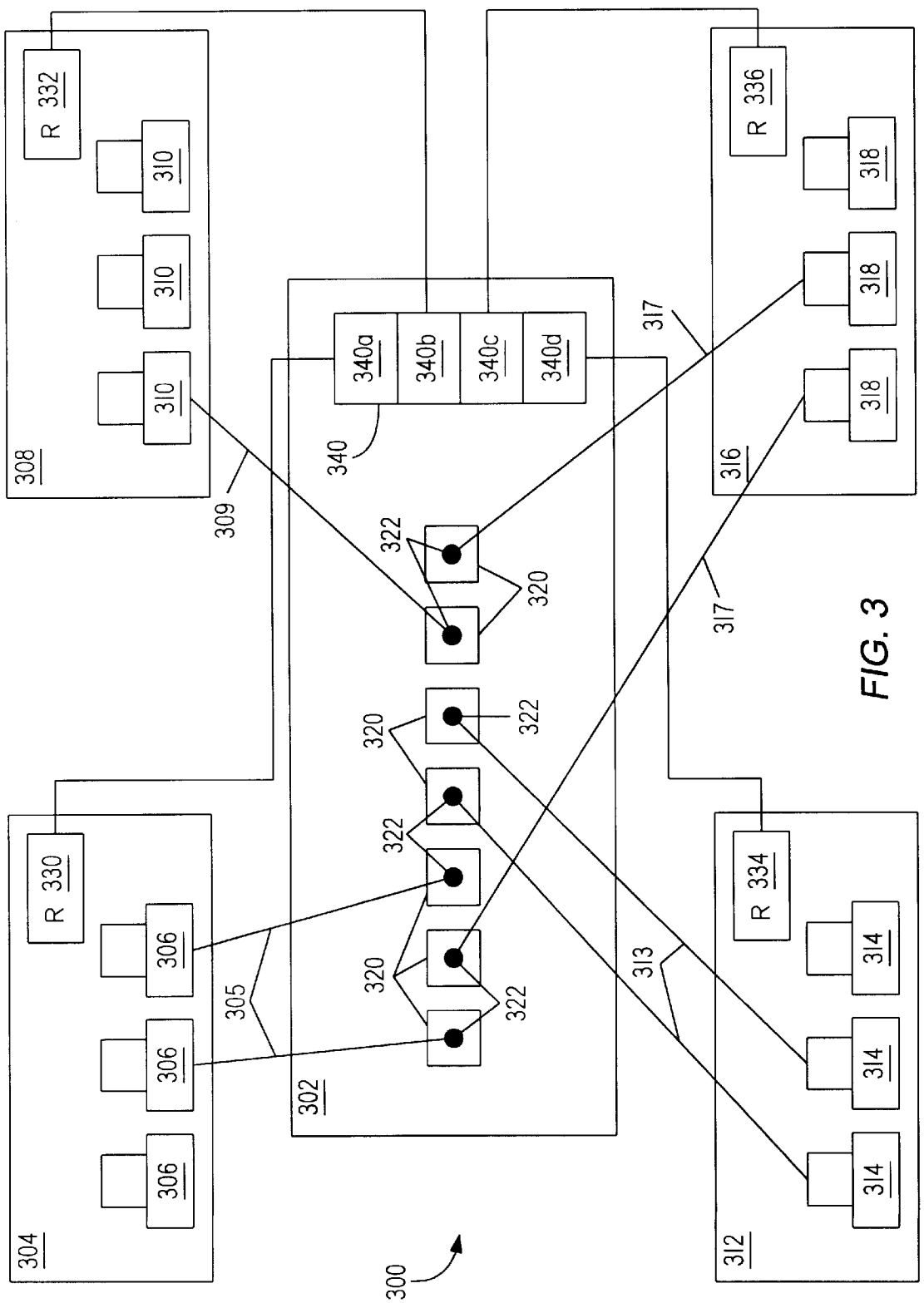
FIG. 3 is a block diagram of network system including an adaptive repeater with an automatic detection system according to the present invention for detecting and interconnecting a plurality of data devices.

Referring now to FIG. 3, a network 300 is illustrated for interconnecting a plurality of data devices, each generally referred to as network devices. The network 300 includes an adaptive repeater 302 incorporating automatic communication protocol detection system according to the present invention for servicing a plurality of network devices within a plurality of domains, where each domain includes network devices operating according to a corresponding communications protocol. Thus, the communication protocol domains 304, 308, is 312 and 316 in the network 300 are preferably associated with different communications protocols. In particular, a first domain 304 is provided for a plurality of data devices 306 operating according to a first communications protocol, a second domain 308 is provided for a plurality of data devices 310 operating according to a second communications protocol, a third domain 312 is provided for a plurality of data devices 314 operating according to a third communications protocol, and a fourth domain 316 is provided for a plurality of data devices 318 operating according to a fourth communications protocol. The data devices 306, 310, 314 and 318 include any source or destination of data connected to the network 300. Each of these data devices are of any type of network device that allows either input or output of data. For example, the network devices may include a computer, work station, file server, hub, NIC, concentrator, modem, printer, or any other device that can receive or transmit data in the network 300 according to one of the supported communication protocols. It is understood that although only four domains 304, 308, 312 and 316 are shown, the repeater 302 may include more or less domains as desired.

The network 300 preferably operates as an Ethernet local area network (LAN), or as any other network communication protocol for communicating data among data devices coupled to the repeater 302. Generally, a communications protocol is any format, definition, or specification for the communication of data, whether implemented in software, hardware, or both. A protocol may include, without limitation, transmission rates, wireline or wireless link specifications, frame formats, blocking formats, text formats, stop/start indicators, framing and heading indicators, field definitions, checksum values, carriage return and line feed (CRJLF) indicators, and any other suitable information that specifies the content or nature of the transmitted data or the link over which the data is transmitted.

The network devices may be coupled to the repeater 302 using unshielded twisted-pair (UTP), shielded twisted-pair (STP), fiber optic lines, wireless links, such as infrared or radio frequency links, or any other link that allows communications of data between the data devices 306, 310, 314 and 318 and the repeater 302. Examples include coaxial cables with BNC connectors, twisted-pair cables with corresponding RJ type connectors, fiber optic cables with FC, MIC, SMA, D-4, etc. connectors, along with many other types of cables and connectors as known in the art. The particular type of cables and connectors used generally depends upon the particular communications protocol being used. The repeater 302 preferably includes a plurality or array of ports 320, each including a corresponding connector 322 for interfacing each of the network devices in the network 300. It is desired that each of the connectors 322 be the same for a particular repeater, so that the particular domains supported by the repeater 302 are capable of using cabling compatible with the connectors 322. For example, the connectors 322 could be RJ-45 jacks for receiving corresponding RJ-45 plugs for interfacing twisted-wire cables, where the repeater 302 includes the 10Base-T, 100Base-TX, 100Base-T4, the CDDI, as well as any other protocol supporting twisted-wire cabling. Alternatively, the connectors 322 could be fiber-optic connectors, where the repeater 302 supports 100Base-FX, FDDI, or any other protocol for using fiber-optic cabling. A hybrid system including different types of connectors 322 is within the scope of the present invention, but will not be described further for purposes of simplicity of explanation.

In the particular embodiment shown, the data devices 306 in the domain 304 preferably operate at 10 Mbps according to the 10Base-T protocol, the data devices 310 in the domain 308 operate at 100 Mbps according to the 100Base-TX protocol, the data devices 314 in the domain 312 operate at 100 Mbps according to the 100Base-T4 protocol, and the data devices 318 in the domain 316 operate at 100 Mbps according to the CDDI protocol. Each of the connectors 322 are preferably RJ-45 jacks for interfacing corresponding RJ-45 plugs integrally coupled to appropriate twisted-wire cables. Cables 305 are used for interfacing the data devices 306 with the repeater 302, cables 309 are used for interfacing the data devices 310 with the repeater 302, cables 313 are used for interfacing the data devices 314 with the repeater 302, and cables 317 are used for interfacing the data devices 318 with the repeater 302. Although the cables 305, 309, 313 and 317 could each be the same and include four pairs of twisted-wires, the cables could also be different based on the communications protocol. For example, the cables 305 need only include two pairs of twisted-pair telephone wire to support the 10Base-T protocol. The cables 309, however, include at least two pairs of category 5 UTP or STP wire to support the 100Base-TX protocol, and the cables 313 include four pairs of category 3, 4 or 5 UTP wire to support the 100Base-T4 protocol. The cables 317 include category 5 UTP twisted-wire pairs capable of supporting transmission rates of up to 155 Mbps.

Each of the domains 304, 308, 312 and 316 optionally include additional compatible repeaters, such as repeaters 330, 332, 334 and 336, respectively, to increase the number of data devices in that particular domain. Also, the repeater 302 optionally includes an appropriate uplink port array 340, including uplink ports 340a, 340b, 340c and 340d for coupling the repeaters 330, 332, 334 and 336, respectively, to the appropriate domains 304, 308, 312, and 316, respectively. Thus, additional data devices 306, 310, 314 and 318 may be added to the respective domains 304, 308, 312 and 316 using the repeaters 330, 332, 334 and 336, respectively. Repeater-to-repeater couplings may be a daisy-chained in this manner to add the number of network devices as desired. Although not shown, the repeater 302 may also include optional bridge ports for interfacing bridge devices for enabling communication between the domains 304, 308, 312 and 316, as desired. Such bridge ports are not shown.

As described further below, each of the ports 320 operates at a selected communications protocol in response to link pulses or data received from a network device coupled to the corresponding connector 322. The repeater 302 is protocol agile, that is, it automatically negotiates the protocol of a data device coupled to any of the ports 320 and selects the appropriate protocol to communicate data. Thus, when a network device is coupled to a port 320 of the repeater 302, the repeater 302 determines the appropriate protocol and places that network device into the appropriate domain. For example, a hub or NIC operating according to 100Base-TX plugged into any one of the ports 320 is detected and placed into the domain 308 by the repeater 302. Further, a network device may modify its data rate and the repeater 302 automatically modifies the associated port 320 to place the coupled network device into the desired repeater domain without modifying couplings at that port. For example, a data device 306 may upgrade from a 10Base-T to a 100Base-TX communications protocol, and the associated port 322 would automatically detect the status change and place that data device 306 into the second domain 308, where the data device would then be considered a data device 310. In this manner, the network 300 includes data devices that operate using different communications protocols and can be easily managed, upgraded, and re-configured without the need to modify the hardware or the couplings at the ports 320.

In operation, the repeater 302 receives data from a network device in a particular domain and operating at a particular communications protocol and then re-transmits this data to other devices coupled to repeater 302 that are operating in the same domain and at that same communications protocol. For example, data transmitted by any one of the data devices 306 in the domain 304 is received by the repeater 302, which re-transmits the data to all the other data devices 306 in the domain 304. Likewise, data transmitted by any one of the devices 310, 314, or 318 is re-transmitted to the other devices 310, 314 or 318, respectively, in the respective domains 308, 312 or 316. Of course, bridge ports and devices may also be included for enabling communication between the domains, but this will not be further discussed.

Figure 4:
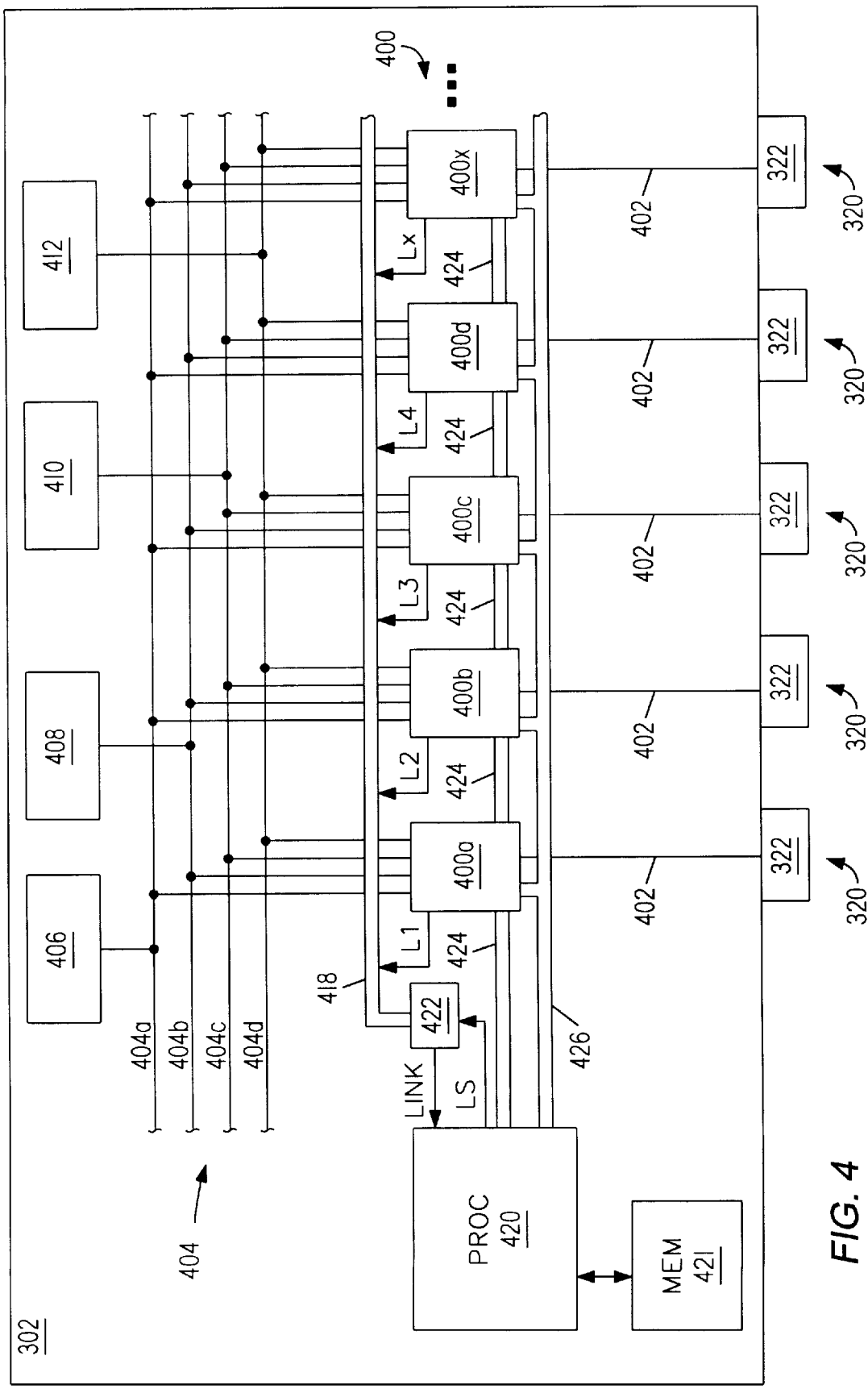
FIG. 4 is a more detailed block diagram of the adaptive repeater of FIG. 3.

Referring now to FIG. 4, a more detailed block diagram is shown of the repeater 302 that includes the ports 320 and the associated port connectors 322. The uplink ports 340 are not shown for purposes of simplicity, but may be implemented according to the principles of the present invention as described for the ports 320. Each port connector 322 is connected to a corresponding interface circuit of an interface circuit array 400 through appropriate data links 402. The particular configuration of the data links 402 depends upon the particular protocols included and supported by the repeater 302. In the preferred embodiment, each of the data links 402 include eight separate and suitable conductors corresponding to the four pairs of twisted wire of a twisted-wire cable plugged into the RJ-45 connectors 322. The interface circuit array 400 includes a separate interface module 400a, 400b, 400c, 400d, etc. for each port connector 322, where although only four connectors 322 and corresponding interface modules 400a–d are shown, it is understood that any number of connectors 322, data links 402, and corresponding interface modules 400 are included on the repeater 302 as desired. Each port 320 includes a connector 322, a data link 402 and a corresponding interface module 400a–d.

Each of the interface modules 400a–d is coupled to a repeater bus array 404 for interfacing the corresponding connector 322 to one of a plurality of repeater modules for bidirectional communications. The repeater bus array 404 includes separate buses 404a,b,c,d, etc., and the repeater modules include a separate module for each communications protocol supported by the repeater 302. In the particular embodiment shown, a bus 404a couples each of the interface modules 400a–d to a 10Base-T repeater module 406, a bus 404b couples each of the interface modules 400a–d to a 100Base-TX repeater module 408, a bus 404c couples each of the interface modules 400a–d to a 100Base-T4 repeater module 410, and a bus 404d couples each of the interface modules 400a–d to a CDDI repeater module 412. As described more fully below, each of the interface modules 400a–d includes a separate transceiver for each communications protocol for coupling its connector 322 to the corresponding repeater module. Although each of the buses 404a–d of the repeater bus array 404 may each be implemented in the same manner, they may also be implemented in different configurations to specifically correspond to the particular protocol of the corresponding repeater module. Each of the is repeater modules 406, 408, 410, 412, etc. includes a separate port (not shown) to enable separate connection to each of the ports 320, if desired. For example, all of the ports 320 could be interfaced to the 100Base-TX repeater module 408 or to the 100Base-T4 repeater module 410 at any given time, although each port 320 is connected to only one repeater module at a time. It is understood that additional corresponding interface modules, buses and repeater modules may be included as desired.

Each of the interface modules 400a–d preferably provides a corresponding link signal L1, L2, L3, L4, respectively, which are provided collectively on a LINK bus 418 to a processor 420. Alternatively, each of the interface modules 400a–d may provide a group of link signals, each individual link signal corresponding to individual transceivers provided within that module. Each of the link signals L1–L4 may be provided directly to the processor 420, but are preferably provided to link select logic 422, which multiplexes the link signals and provides a corresponding LINK signal to the processor 420. In this manner, the processor 420 asserts a link select signal LS to the link select logic 422 for selecting and monitoring one of the link signals L1–L4 of the LINK bus 418 at a time. For operation according to one embodiment of the present invention, the processor 420 selects and periodically monitors each of the L1–L4 signals one at a time in round-robin fashion for determining any status changes of the corresponding port 320. In an alternative embodiment according to the present invention, the link select logic 422 includes logic or circuitry to continually monitor the link signals L1–L4, and then asserts the LINK signal to interrupt the processor 420 in the event of a status change. The processor 420 executes an interrupt routine to determine the source of the interrupt, identifies the port 320 which has changed status, and takes the appropriate action to update the modified port.

The processor 420 is preferably any suitable type of microprocessor or microcontroller for monitoring and controlling the status of the interface modules 400a–d. The processor 420 is preferably coupled to a memory 421, such as a read-only memory (ROM), a random-access memory (RAM) or the like, or a combination thereof, for storing routines executed by the processor 420, as well as for storing and/or retrieving any parameters and data. The processor 420 preferably asserts interface select signals on a select signal bus 424 for selecting one of the interface modules 400a–d, and also asserts enable data on a port data bus 426 for programming the selected interface module. As described further below, each of the interface modules 400a–d includes a plurality of transceivers, where the enable data provided on the bus 426 is used to select an appropriate one of the transceivers. In an alternative embodiment, the bus 426 could include separate data signals for each of the interface modules 400a–d, although the bus 426 would be larger to include a large number of ports 320 and corresponding interface modules 400a–d. Of course, any type of select mechanism and appropriate logic could be included for enabling the processor 420 to select and program the interface modules 400a–d.

Once programmed by the processor 420, the selected one of the interface modules 400a–d enables connection of its corresponding connector 322 to the appropriate repeater 406, 408, 410 or 412 indicated by the data from the processor 420. For example, a network device operating according to 10Base-T connected to the connector 322 corresponding to the interface module 400a is coupled to the 10Base-T repeater 406 through the bus 404a by the interface module 400a as controlled by the processor 420. Similarly, a network device operating according to 100Base-T4 connected to any of the connectors 322 is coupled through the bus 404c to the 100Base-T4 repeater 410 by the corresponding interface module 400a–d of that port 320. In this manner, the processor 420 executes appropriate routines to monitor the status of the ports 320 through the link signals L1–L4 of the interface modules 400a–d, and programs the interface modules 400a–d accordingly.

Figure 5:
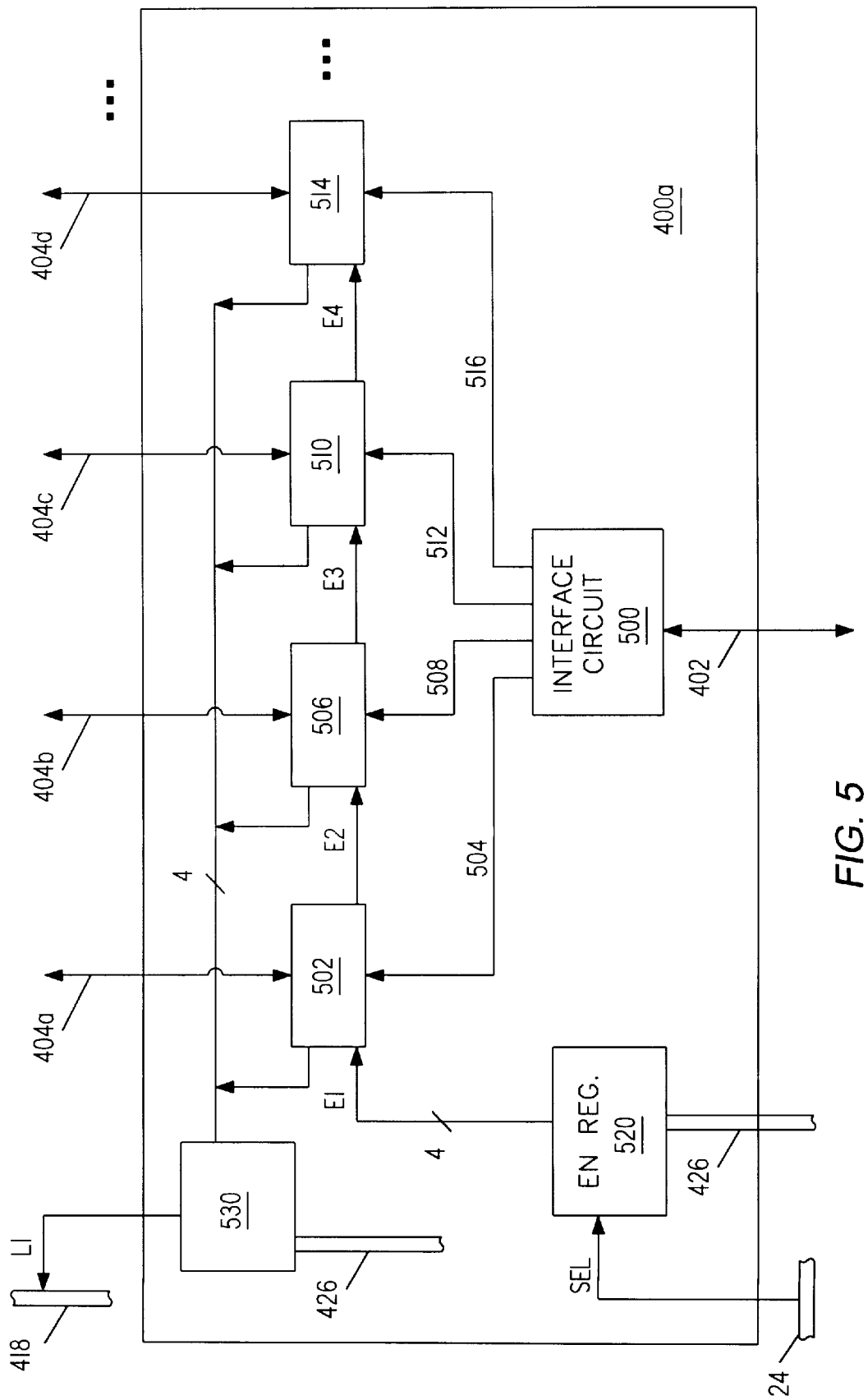
FIG. 5 is a more detailed block diagram of the interface modules of FIG. 4.

FIG. 5 is a more detailed diagram of the interface module 400a, which is representative of all of the transceivers 400a–d. The data link 402 is coupled through an interface circuit 500 to one or more transceivers, including a 10Base-T transceiver 502 through a data link 504, a 100Base-TX transceiver 506 through a data link 508, a 100Base-T4transceiver 510 through a data link 512, and a CDDI transceiver 514 through a data link 516. The interface circuit 500 could include a transformer and other circuitry for interfacing the data link 402 to the respective transceivers. The transceivers 502, 506, 510 and 514 are coupled to respective portions of the corresponding buses 404a, 404b, 404c and 404d, respectively, for connection to the respective repeaters 406, 408, 410 and 412, for enabling bidirectional communication or communication in either direction. An enable register 520 receives a select signal SEL from the select signal bus 424 for enabling the register 520 to receive corresponding data from the processor 420 through the bus 426 when the interface module 400a is selected. The register 520 asserts corresponding enable signals E1, E2, E3 and E4 for enabling one of the transceivers 502, 506, 510 and 514, respectively, at a time.

Each of the transceivers 502, 506, 510 and 514 asserts a link signal if link pulses are detected when that transceiver is enabled. As shown in FIG. 5, the link signals are collectively grouped as a link signal L1. Select logic 530, such as a multiplexer or the like, is coupled to the bus 426 and/or the enable register 520 and receives the individual link signals and asserts the L1 link signal on the LINK bus 418 corresponding to the enabled one of the transceivers 502, 506, 510 and 514. In an alternative embodiment, the L1 link signal represents a group of link signals including an individual link signal for each of the transceivers 502, 506, 510 and 514. In yet another embodiment, the link signals are all tied together in a wired-or fashion for asserting one electrical signal. In any of these embodiments, the processor 420 determines whether the enabled transceiver is asserting a link signal in response to receiving link pulses. For purposes of simplicity, the link signals from the modules 400a–d are referred to as the link signals L1–L4, respectively.

Figure 6A:
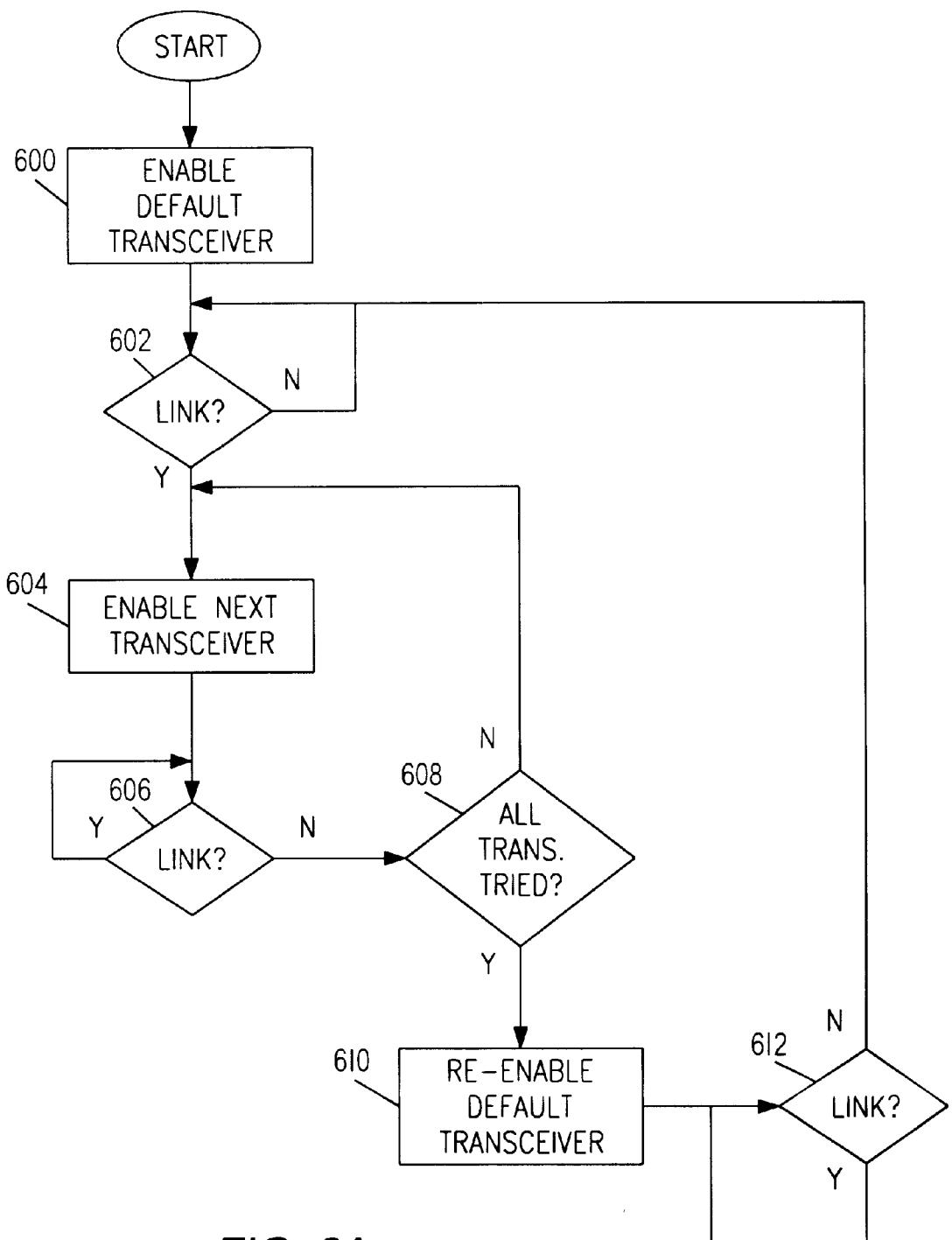
FIGS. 6A, 6B and 6C are flowchart diagrams illustrating operation of the network system of FIGS. 3–5.
Figure 6B:
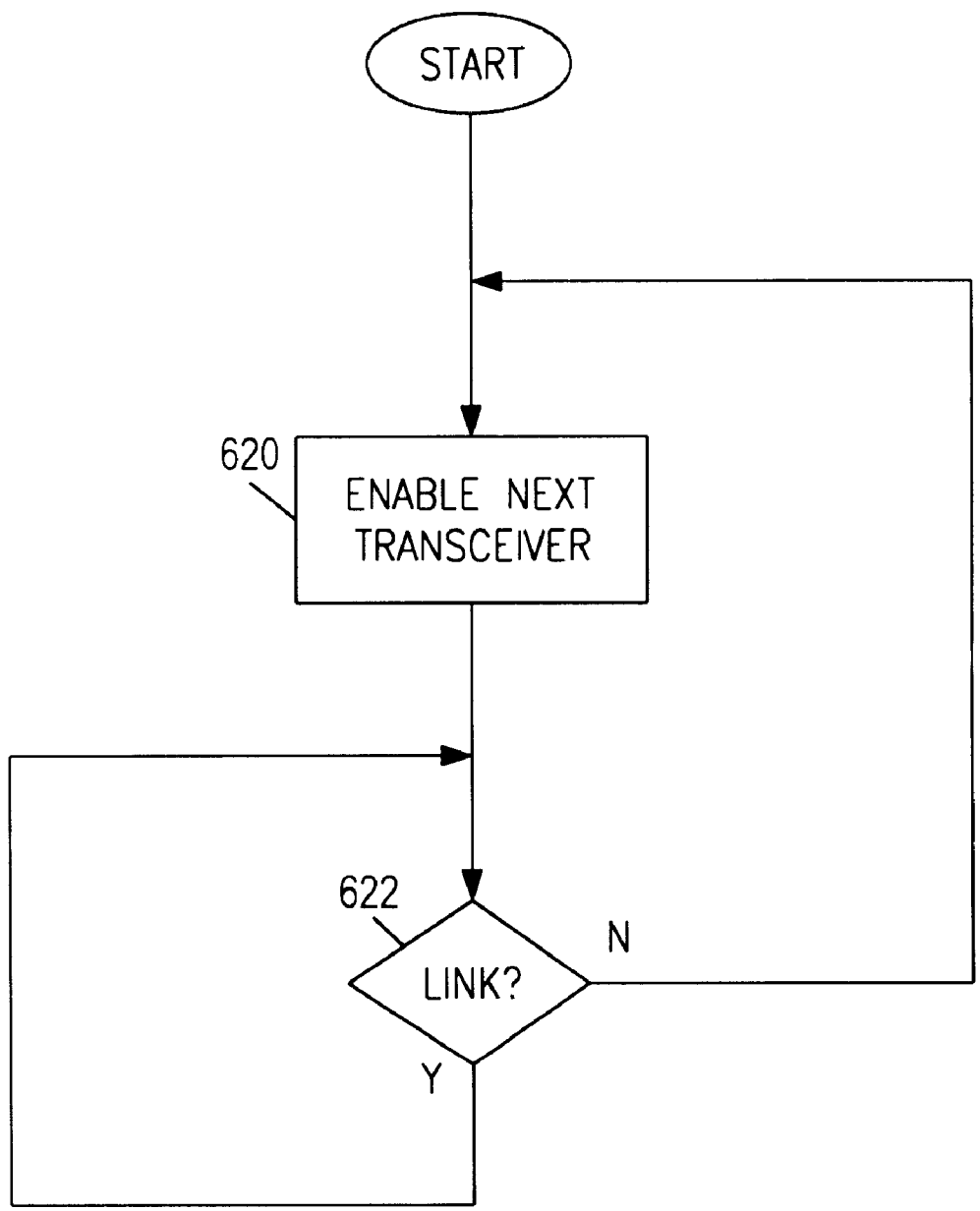
Figure 6C:
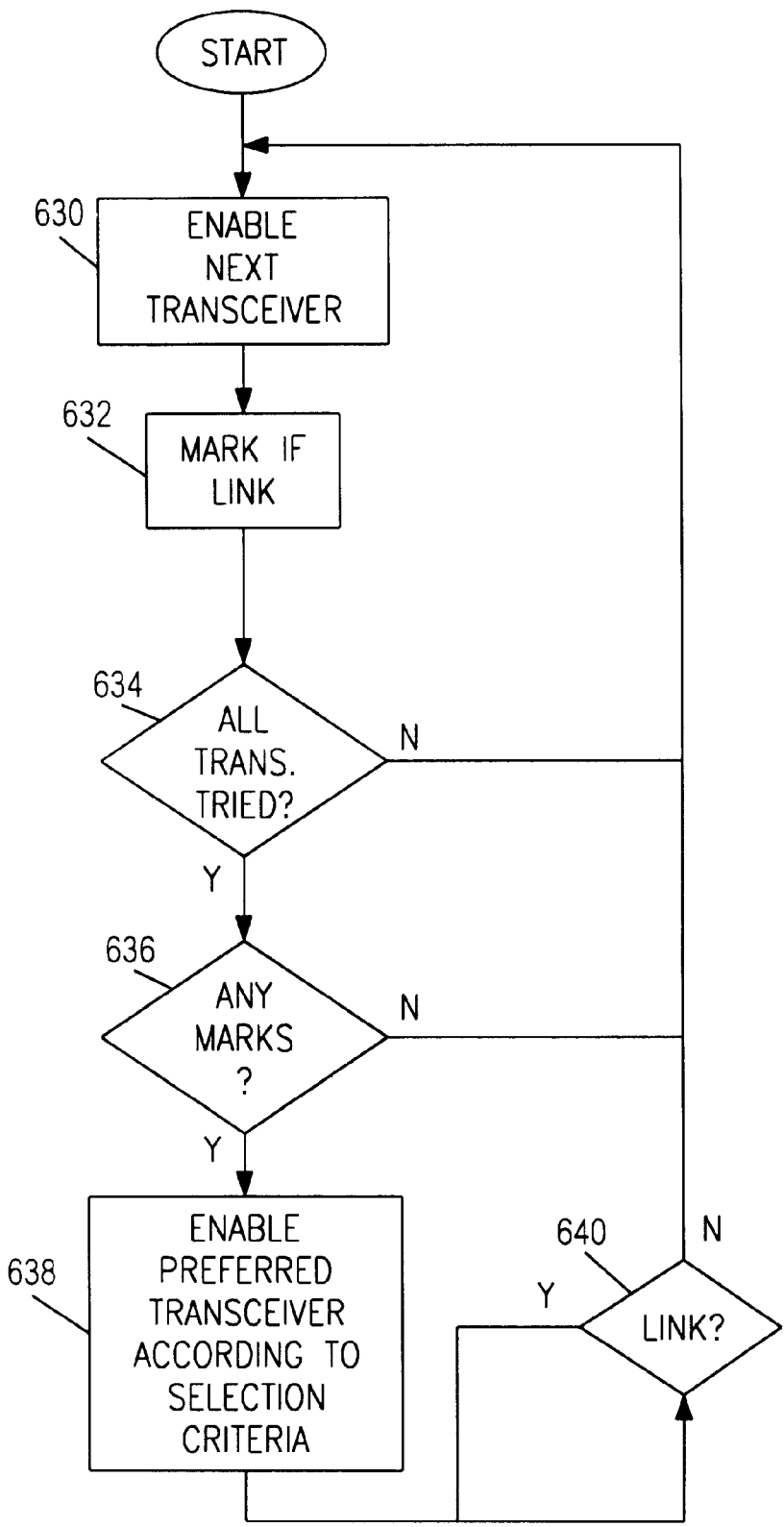

FIGS. 6A, 6B and 6C illustrate alternative modes of operation of the network 300 shown in FIGS. 3–5. The particular mode of operation of the repeater 302 chosen depends upon the communication protocols supported and the particular configuration of those protocols. In general, three primary modes of operation are contemplated as illustrated by respective flowcharts in FIGS. 6A–6C, although many variations are possible. Each of the flowcharts in FIGS. 6A–6B represent operation for each of the interface modules 400a–d.

In a first mode of operation as shown in FIG. 6A, the processor 420 initializes each of the interface modules 400a–d to a default transceiver corresponding to a default repeater domain in step 600, such as the 10Base-T repeater 406, and periodically queries each of the link signals L1–L4 for indication that link pulses have been detected in step 602. This mode is sufficient as long as link pulses are detectable by the particular default transceiver within each interface module 400a–d for all supported types of communication protocols. For example, link pulses asserted by a 100Base-TX network device must also be detected by a default 10Base-T transceiver. In response to detection of link pulses and assertion of one of the L1–L4 link signals in step 602, the processor 420 enables each of the remaining transceivers one at a time within the interface module asserting the corresponding link signal and again periodically monitors the LINK signal to determine if link pulses are still being detected, as indicated in steps 604 and 606. This is preferably performed in round-robin fashion, where each of the transceivers 502, 506, 510, 514 are enabled one at a time in any particular order desired, as indicated by the looping steps 604, 606 and 608.

If link pulses are detected by any transceiver when enabled other than the default transceiver, as indicated by the corresponding L1–L4 link signal, then that currently enabled transceiver is used. In particular, operation loops as indicated in step 606, and the corresponding link signal is periodically monitored. Otherwise, the default transceiver is re-enabled in step 610, and used for communication as indicated in step 612. Thus, once a communication link is established, the processor 420 periodically monitors the corresponding link signal to determine if communication is maintained or not as indicated in steps 606 and 612. If the corresponding link signal indicates the communication is terminated or otherwise not maintained, then operation returns to step 602 and repeats the above process.

In an alternative mode of operation as shown in FIG. 6B, the processor 420 continuously re-programs each of the interface modules 400a–d to select a new transceiver in round-robin fashion as indicated in step 620, and then periodically monitors the corresponding L1–L4 link signals until the corresponding link signal indicates that link pulses are detected, as indicated in step 622. Once detected, the processor 420 maintains the selected transceiver until the corresponding L1–L4 link signal indicates that link pulses are no longer being provided indicating disconnection of a network device or any other change in the status of the port terminating communications. If a change in status is detected, the processor 420 once again returns to step 620 and selects re-enables the next one of the transceivers within the corresponding interface module.

It is noted that if one of the L1–L4 link signals is asserted when the 10Base-T transceiver is enabled, the processor 420 could also attempt enabling the 100Base-TX transceiver to determine if a 100Base-TX device is connected in a similar manner as described above in FIG. 1 and FIGS. 2A, 2B and 2C. If the 100Base-TX transceiver is enabled and link pulses are detected, then the 100Base-TX transceiver is used, and if link pulses are not detected, then the 10Base-T transceiver is re-enabled and used. In this manner, the processor 420 controls each of the transceivers 502, 506, 510, 514 of each of the interface modules 400a–d for periodically monitoring and updating the ports 320 to identify the particular protocol of network devices connected to the ports 320.

FIG. 6C illustrates a third mode of operation, where the transceivers 502, 506, 510 and 514 are enabled one at a time in round-robin fashion, and if the corresponding one of the link signals is detected, the processor 420 selects one of the transceivers according to a predetermined selection criterion. For example, if the 10Base-T transceiver 502 and the 100Base-TX transceiver 506 both detect link pulses, then the 100Base-TX transceiver 506 is chosen and used. No default transceivers are assumed. In step 630, the next transceiver is enabled and if link pulses are detected, that transceiver is "marked" in step 632, where the processor 420 simply remembers that the enabled transceiver detected link pulses. This is performed for all transceivers as indicated in step 634. Then, it is determined if any transceivers were marked or detected link pulses in step 636. If not, operation returns to step 630 to repeat the procedure. If any are marked, then the processor 420 selects one of the marked transceivers in step 638 and then periodically monitors the corresponding link signal in step 640. Operation remains looping in step 640 while communication is maintained, but otherwise returns to step 630 to repeat the procedure.

It is now appreciated that a communication protocol detection system and method according to the present invention enables automatic detection of and communication with a network device operating according to any one of several communication protocols. The present invention has been illustrated with a network card of a computer system to detect and connect to an external network using the appropriate and compatible protocol. The present invention has also been illustrated for use with more sophisticated network devices, such as repeaters, hubs, concentrators, or the like, to enable interfacing and communication among a plurality of network devices, each operating according to any one of a plurality of communication protocols. This capability enables the network system to be managed, upgraded and/or reconfigured without the need for modification of hardware.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A network interface system for coupling to and interfacing with any network device that operates according to at least one of a plurality of communication protocols, the network interface system comprising:
   a port for coupling to a network device, the network device operating according to at least one of a plurality of communication protocols and providing a corresponding one of a plurality of connection indications via the port;
   a plurality of interface circuits coupled to the port, each corresponding to one of the plurality of communication protocols and each indicating detection of a compatible network device that is coupled to the port and providing a connection indication via the port; and
   control logic, coupled to the plurality of interface circuits, that enables any one of the plurality of interface circuits indicating detection of a compatible network device to enable communication with the network device.

2. The network interface system of claim 1, further comprising:
   the port including a plurality of signal connections; and
   each of the plurality of connection indications comprising at least one signal asserted via at least one of the plurality of signal connections of the port.

3. The network interface system of claim 1, wherein each of the plurality of interface circuits comprises a transceiver that enables bidirectional communication via the port.

4. The network interface system of claim 1, further comprising:
   a physical interface device that is coupled between the port and each of the plurality of interface circuits.

5. The network interface system of claim 1, further comprising:
   a media access control device that is coupled to each of the plurality of interface circuits to enable to enable bidirectional communication via any one of the plurality of interface circuits that is enabled.

6. The network interface system of claim 5, further comprising:
   a computer system that implements the control logic, comprising:
      a memory that stores network software;
      a processor coupled to the memory that executes the network software from the memory; and
      an expansion bus that includes slots to receive expansion cards; and
   a network expansion card, implemented for plugging into a slot of the expansion bus, that incorporates the media access control device, the port and the plurality of interface circuits, so that the media access control device and the plurality of interface circuits are coupled to the control logic via the expansion bus slot.

7. The network interface system of claim 1, wherein the control logic enables each of the plurality of interface circuits one at a time until one of the plurality of interface circuits indicates detection of a compatible network device.

8. The network interface system of claim 7, wherein the control logic keeps an interface circuit that indicates detection of a compatible network device enabled until it no longer indicates detection of a compatible network device, and then returns to enabling each of the plurality of interface circuits one at a time.

9. A communication protocol detection system for interfacing with at least one of a plurality of network devices, wherein each of the plurality of network devices operates according to at least one of a plurality of different communication protocols, the communication protocol detection system comprising:
   a plurality of network ports;
   a plurality of interface circuits, each corresponding to one of the plurality of network ports and each including a plurality of transceivers, wherein each of the plurality of transceivers of each of the plurality of interface circuits is coupled to the corresponding one of the plurality of network ports and corresponds to one of the plurality of communication protocols, and wherein each of the plurality of transceivers provides a detection indication upon detection of a compatible connection indication provided via the corresponding one of the plurality of network ports; and
   control logic, coupled to each of the plurality of transceivers of each of the plurality of interface circuits, that enables any of the plurality of transceivers within each of the plurality of interface circuits that provides a detection indication.

10. The system of claim 9, wherein each of the plurality of transceivers of each of the plurality of interface circuits enables bidirectional communication via the corresponding one of the plurality of network ports according to one of the plurality of communication protocols.

11. The system of claim 9, wherein for each of the plurality of interface circuits, the control logic enables each of the plurality of transceivers one at a time until a transceiver provides a detection indication.

12. The system of claim 11, wherein the control logic keeps a transceiver that provides a detection indication within an interface circuit enabled until it no longer provides the detection indication, and then returns to enabling each of the plurality of transceivers one at a time within that interface circuit.

13. A method of detecting the communication protocol of a network device operating according to at least one of a plurality of communication protocols coupled to a network port of a network system, the network system including a plurality of transceivers coupled to the network port, wherein each of the plurality of transceivers corresponds to one of the plurality of communication protocols, and wherein each of the transceivers provides a detection indication upon detection of a compatible connection indication provided via the port, the method comprising the steps of:

for each transceiver, determining if a corresponding detection indication is provided; and establishing communications via the port using a transceiver providing a detection indication.

14. The method of claim 13, further comprising the steps of:

periodically enabling each of the plurality of transceivers one at a time; and for each enabled transceiver, determining if a corresponding detection indication is provided.

15. The method of claim 13, after the step of establishing communications, further comprising the steps of:

periodically monitoring the detection indication from the transceiver used for communications; and when the detection indication from the transceiver is no longer provided, repeating the steps of determining if a corresponding detection indication is provided for each transceiver and establishing communications via the port using a transceiver providing a detection indication.

* * * * *